United States Patent [19]

Salsman et al.

[11] Patent Number: 5,748,379
[45] Date of Patent: May 5, 1998

[54] OPTICAL ENGINES FOR TRICOLOR PROJECTORS HAVING CO-PLANAR LIKE OPTICAL ELEMENTS

[75] Inventors: Kenneth E. Salsman, Brush Prairie; Amjad I. Malik, Vancouver, both of Wash.; Gary B. Kingsley, Tigard, Oreg.

[73] Assignee: Delta America Ltd., Fremont, Calif.

[21] Appl. No.: 705,708

[22] Filed: Aug. 20, 1996

[51] Int. Cl.$^6$ .................................................. G02B 27/14
[52] U.S. Cl. .................................................. 359/634; 349/8
[58] Field of Search .................................. 359/634; 349/8

[56] References Cited

U.S. PATENT DOCUMENTS

| | | | |
|---|---|---|---|
| 4,516,837 | 5/1985 | Soref et al. | 350/347 |
| 4,850,685 | 7/1989 | Kamakura et al. | 350/397 |
| 4,904,061 | 2/1990 | Aruga | 350/339 F |
| 5,067,799 | 11/1991 | Gold et al. | 359/490 |
| 5,096,288 | 3/1992 | Yano et al. | 353/69 |
| 5,097,323 | 3/1992 | Sato et al. | 358/60 |
| 5,105,265 | 4/1992 | Sato et al. | 358/60 |
| 5,115,305 | 5/1992 | Baur et al. | 358/60 |
| 5,153,752 | 10/1992 | Kurematsu et al. | 359/40 |
| 5,157,523 | 10/1992 | Yamagishi et al. | 359/41 |
| 5,170,250 | 12/1992 | Ledebuhr | 358/60 |
| 5,221,998 | 6/1993 | Sugahara | 359/831 |
| 5,241,407 | 8/1993 | Sonehara et al. | 359/40 |
| 5,245,449 | 9/1993 | Ooi et al. | 359/40 |
| 5,270,804 | 12/1993 | Lach | 358/62 |
| 5,276,523 | 1/1994 | Kurematsu et al. | 358/236 |
| 5,283,600 | 2/1994 | Imai | 353/34 |
| 5,298,986 | 3/1994 | Owada et al. | 348/762 |
| 5,404,234 | 4/1995 | Taniguchi et al. | 359/15 |
| 5,418,583 | 5/1995 | Masumoto | 353/38 |
| 5,418,586 | 5/1995 | Fujimori et al. | 353/122 |
| 5,481,320 | 1/1996 | Konuma et al. | 348/751 |

FOREIGN PATENT DOCUMENTS

| | | |
|---|---|---|
| 2-301739A | 12/1990 | Japan . |
| 3-84536A | 4/1991 | Japan . |
| 4-223456A | 8/1992 | Japan . |

*Primary Examiner*—David C. Nelms
*Assistant Examiner*—Thomas Robbins
*Attorney, Agent, or Firm*—Skjerven, Morrill, MacPherson Franklin & Friel; David W. Heid

[57] ABSTRACT

The invented optical engines are characterized as including generally parallel planar glass plate-mounted or coated dichroic and turning mirror and light valve elements. An important topological feature of the invented optical engines is the fact that like optical elements are positioned and oriented to be coplanar, i.e. the light-splitting dichroic mirror elements are coplanar with one another, the split beam-turning mirror elements are coplanar and the light valves are coplanar. This important feature of the invention renders compact optical engines that are simply and inexpensively manufactured and maintained because the critical optical elements are in part self-aligning when like optical elements are placed in an aligning mounting structure or more preferably on a common substrate that renders them self-positioning and self-aligning relative to one another. A common white light entry region and modulated tricolor beam exit region of the invented optical engines, coupled with equal optical path lengths through the engine, permit the use of a single input pupil astigmatism correction plate near the entry region and a single output image astigmatism correction plate assembly near the exit region of the engines. The optical engines may be used along with conventional other optical elements including, for example, a white light source and an optical output stack, to render a pixel-modulated tricolor projector.

27 Claims, 1 Drawing Sheet

OPTICAL ENGINES FOR TRICOLOR PROJECTORS HAVING CO-PLANAR LIKE OPTICAL ELEMENTS

BACKGROUND AND SUMMARY OF THE INVENTION

The invention generally relates to tricolor image projection systems. More particularly, it concerns improved optical engines capable of high-resolution, high-contrast, high-brightness tricolor image projection for small, lightweight and inexpensively and easily manufactured and maintained projectors.

Optical engines are used in tricolor optical projectors to split white light typically into the three primary colors, to modulate the three colored light beams as by use of pixelated light valves and to combine the three modulated color light beams into a tricolor beam for image projection. Typically, such optical engines utilize turning mirrors for folding light beams, dichroic mirrors for selectively transmitting certain color spectra while reflecting others and liquid crystal shutters for pixelated modulation under the control of an analogue or digital signal processor or controller. These optical elements may be configured on plates, e.g. of glass or high-index plastic, or in some cases may be applied as films or coatings directly to interior or exterior surfaces of solid prisms of glass, plastic or other optically suitable material.

The invented optical engines are characterized as including generally parallel planar glass plate-mounted or coated dichroic and turning mirror and light valve elements. An important topological feature of the invented optical engines is the fact that like optical elements are positioned and oriented to be coplanar with one another, i.e. the light-splitting dichroic mirror elements within each of the splitter and combiner are coplanar with one another, the split beam-tuning mirror elements within each of the splitter and combiner are coplanar with one another and the light valves within each of the splitter and combiner are coplanar with one another.

This important feature of the invention renders compact optical engines that are simply and inexpensively manufactured and maintained because the critical optical elements are in part self-aligning when like optical elements are placed in an aligning mounting structure or more preferably on a common substrate that renders them self-positioning and self-aligning relative to one another. A common white light entry region and modulated tricolor beam exit region of the invented optical engines, coupled with equal optical path lengths through the engine, permit the use of a single input pupil astigmatism correction plate near the entry region and a single output image astigmatism correction plate assembly near the exit region of the engines. The optical engines may be used along with conventional other optical elements including, for example, a white light sources and an optical output stack to render a pixel-modulated tricolor projector.

Another interesting feature of the invention is that the proposed optical engines each includes a dichroic mirror which has opposing substantially parallel planar surfaces, and wherein this mirror is positioned and oriented within the engine in such a fashion that it selectively and simultaneously splits a first light beam which is incident on one of the opposing surfaces, and combines that split light beam with a modulated second light beam that is incident upon the other of the two opposing surfaces. Still a further way of characterizing this mirror in the engines illustrated and described herein is that simultaneously it selectively transmits one beam which is incident upon one of the opposing surfaces, and reflects another beam which is incident upon the other of the opposing surfaces. These two ways of characterizing an interesting and important feature of the mirror just mentioned in the disclosed engines, focuses on an appealing element of simplicity and versatility in the engine designs proposed by the invention.

These and other objects and advantages of the invention will be more clearly understood from a consideration of the accompanying drawings and the following description of the preferred embodiment.

DETAILED DESCRIPTION OF THE PREFERRED EMBODIMENTS

The invented optical engines are for use in a projected display device capable, for example, of projecting still or motion pictures for audience presentations. The optical engines take three basic forms: 1) the semi-V-shaped, reflective light valve configuration shown in FIG. 1; 2) the V-shaped, transmissive light valve configuration shown in FIG. 2; and 3) the semi-inverted V-shaped, transmissive light valve configuration shown in FIG. 3. The V designation will be understood to refer generally to the shapes of the areas defined between various optical elements that form the optical engines.

In each configuration, pairs of parallel, spaced, glass plates are mounted within the optical engine by any suitable mounting structure, not shown for the sake of clarity, thereby to align and stabilize them relative to one another and to render a mechanically and optically durable and compact optical engine capable of splitting white light into three colors, e.g. red, green and blue, pixel-modulating the individual colors by a video signal and combining the modulated colors into a tricolor rendition for projected display on a wall or screen.

Figure 1:
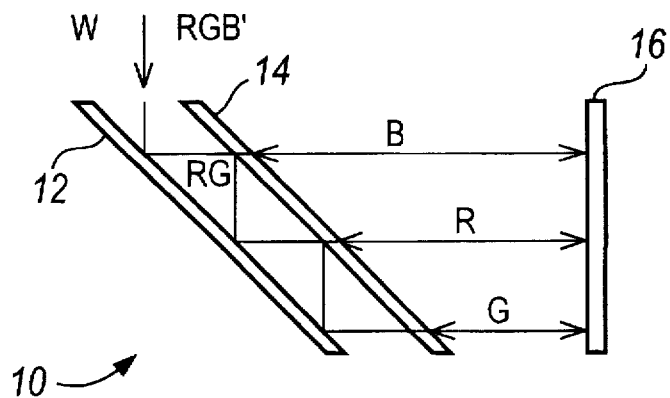
FIG. 1 is a schematic block diagram of an optical engine made in accordance with a preferred embodiment of the invention.

FIG. 1 shows a semi-V-shaped optical engine 10 useful for color separation and combination. Illustrated semi-V-shaped optical engine 10 preferably includes a turning mirror 12 and a dichroic mirror 14, wherein mirrors 12, 14 are arranged in a parallel, spaced-apart configuration and are oriented in edge view as shown at an inclined angle relative to a reflective light valve or liquid crystal shutter 16. White light W from a white light source (not shown) entering an entry/exit region, indicated generally at 18, between mirrors 12, 14 is reflected from turning mirror 12 toward dichroic mirror 14 where, in the first instance, one of the three color beams, e.g. blue beam B, is by virtue of the dichroic coating within that region of the dichroic mirror transmitted. A red/green beam RG is reflected by the same dichroic coating toward the turning mirror where it is reflected again.

The red/green beam RG is incident upon a second dichroic region of dichroic mirror 14, where by virtue of the dichroic coating within that region of the mirror 14 another one of the three color beams, e.g. red beam R, is transmitted and a third one of the three color beams, e.g. green beam G, is reflected. The green beam G is reflected at this dichroic surface toward turning mirror 12 where it is reflected again toward dichroic mirror 14. The green beam G incident upon a third, preferably uncoated region of dichroic mirror 14 is transmitted therethrough by virtue of the fact that there is no dichroic coating in this region of the dichroic mirror and the fact that only green light is present in the incident beam.

The three separated or split color beams B, R, G are incident upon reflective light valve or liquid crystal shutter 16, which preferably is of the multi-layer, thin-film type. It will be appreciated that liquid crystal shutter 16 is under the control of an analogue or digital signal processor or controller, not shown, that may be of conventional design. The controller provides pixelated control of the three regions of liquid crystal shutter 16 to enable selective pixels within the two-dimensional arrayed individual tricolor beams to reflect back onto the inclined surface of dichroic mirror 14.

At the two color selective dichroic coatings in the three described regions of dichroic mirror 14, the blue, red and green pixel-modulated beams B', R' and G' traverse the reverses of the paths they traversed upon entry to the space within the configured turning and dichroic mirrors 12, 14 and entry/exit region 18 of optical engine 10 to emerge as a modulated RGB' beam suitable for projected display.

Dichroic mirror 14 provides at the dichroic surface for the simultaneous reflection of one color beam of light and transmission of another color beam of light. For example, modulated green beam G' is reflected from a first surface of the intermediate dichroic region of dichroic mirror 14 while simultaneously thereat modulated red beam R' incident upon an opposite surface is transmitted therethrough.

Similarly, dichroic mirror 14 provides for the simultaneous splitting or separation of two or more color beams by selectively reflecting at least one color beam while transmitting another color beam and the combining of a modulated color beam with such reflected at least one such color beam. For example, green beam G is split from red beam R and modulated green beam G' is combined with modulated red beam R' at the same intermediate dichroic region of dichroic mirror 14.

It will be appreciated that the embodiment of the invented optical engine 10 of FIG. 1, within the spirit of the invention, may be modified in suitable ways to effect different performance goals. For example, it may be seen by those skilled in the art that there is a tradeoff inherent in the invented semi-V-shaped, reflective between distortion reduction and complexity reduction. The illustrated embodiment is simpler, but suffers slightly more distortion of the tricolor modulated image due to unequal path lengths traversed among the red, green and blue light beams. It may be seen that the blue beam traverses a shorter path than the red beam and that the red beam traverses a shorter path than does the green beam, due to the stair-step course the red and green beams take in the space between the turning mirror elements and the dichroic mirror elements.

Figure 2:
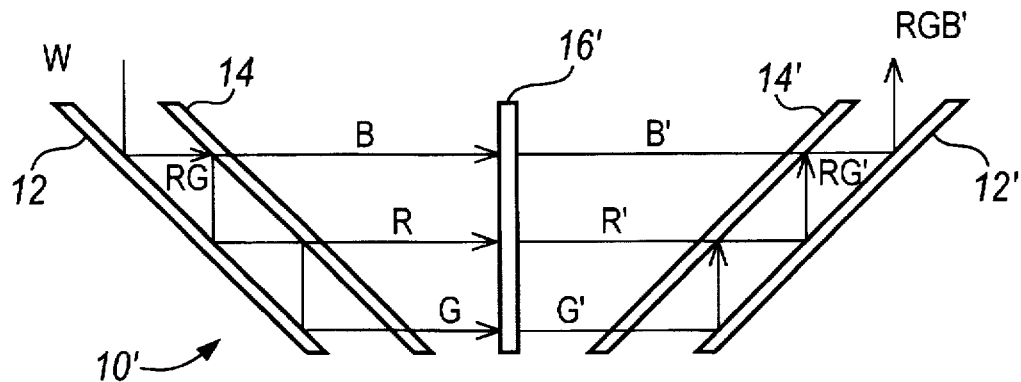
FIG. 2 is a schematic block diagram of an alternative embodiment of the invented optical engine.

Turning next to FIG. 2, an alternative embodiment of the invented optical engine will be described. It will be appreciated that in the configuration of FIG. 2, which is referred to herein as V-shaped, is similar to that of FIG. 1, except that light valve 16' is transmissive rather than reflective, and a second, left-to-right mirror-image parallel plate pair corresponding to turning mirrors 12' and dichroic mirrors 14' are provided on the opposite side of transmissive light valve 16'. Because of the great similarities between elements to the right and left of transmissive light valve 16', the same reference designators will be used herein, but with their distinctions denoted by one or more apostrophes (e.g. ' or ").

It may be seen from FIG. 2 that turning and dichroic mirror elements 12', 14' are arranged essentially in a left-to-right mirror image around transmissive light valve 16', with the dichroic and turning mirror elements performing the same combining function as is described above in connection with FIG. 1 in terms of the return path of the modulated, reflected blue, red and green beams. This invented configuration is referred to herein as a V-shaped optical engine 10', because of its resemblance to the letter V that results from the generally 45°, reverse inclines of the parallel mirrored plates on either side of the transmissive light valve.

Figure 3:
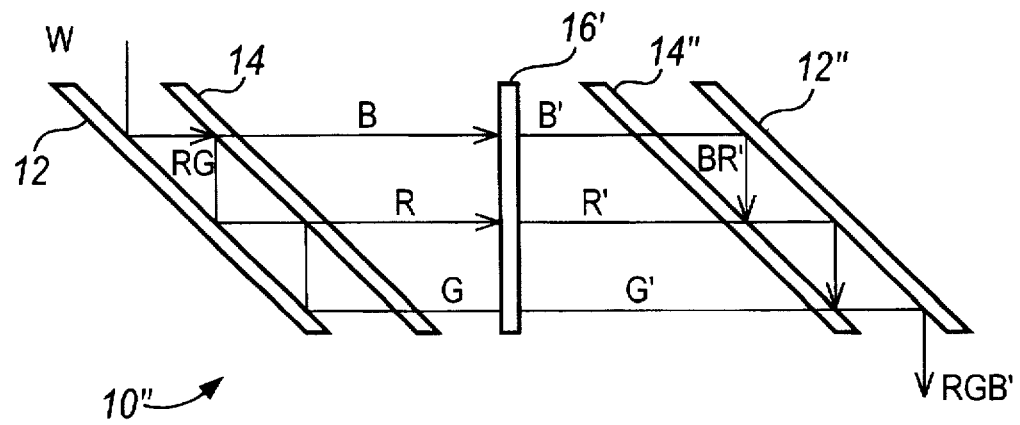
FIG. 3 is a schematic block diagram of yet another embodiment of the invented optical engine.

Turning finally to FIG. 3, it may be that yet another variation on the optical engine is possible in accordance with the invention. Optical engine 10" is very similar to optical engine 10' described above, but the modulated tricolor light beam exits the engine from the opposite side of the white light beams' entry thereinto. Significantly, optical engine 10" provides equal optical path lengths for the red, green and blue light beams as they traverse the engine. This is because of the parallel arrangements of dichroic mirrors 14, 14" and turning mirrors 12, 12" on either side of transmissive light valve 16'.

Those skilled in the art will appreciate that the red, green and blue beams need not be arranged as illustrated and that alternative arrangements are within the spirit and scope of the invention, especially for optical engines 10, 10' which are characterized as having different optical path lengths for the three color light beams. For example, the order may be reversed to some advantage such that the green beam is reflected toward the light valve first and the blue beam is reflected toward the light valve last. This requires only that the upper dichroic coating have a green pass-band instead of a blue pass-band. This is desirable in some applications because the blue light beam, which must traverse a longer optical path, is less critical to tricolor projection brightness than is the green light beam. Other modifications may be made within the spirit and scope of the invention.

Accordingly, while a preferred embodiment of the invention has been described herein, and preferred methods associated therewith, it is appreciated that modifications are possible that are within the scope of the invention.

It is claimed and desired to secure by Letters Patent:

1. In an optical engine for splitting a white light beam into at least a first and a second color light beam, for modulating the first and second color light beams and for recombining the modulated color light beams to produce a modulated polychromatic output light beam, the improvement comprising:

a first dichroic mirror element group including plural dichroic mirrors positioned and oriented in coplanar relationship with one another;

a first turning mirror element group including plural turning mirrors positioned and oriented in coplanar relationship with one another, said first dichroic mirror element group and said first turning mirror element group cooperating to split white light into plural color beams and to direct the same outwardly away from said first dichroic mirror element group; and a light valve group including plural light valves positioned and oriented in coplanar relationship with one another, said light valve group being positioned and oriented to receive plural color beams directed from said first dichroic mirror element group.

2. The improvement of claim 1, wherein said two mirror element groups are spaced apart in parallel relationship with one another.

3. The improvement of claims 1 or 2, wherein said first dichroic mirror element group and said first turning mirror element group are spaced apart in parallel relationship with one another.

4. The improvement of claims 1 or 2, wherein said light valve group is mounted on a common substrate.

5. The improvement of claims 1 or 2, wherein said dichroic mirror group is mounted on a common substrate.

6. The improvement of claims 1 or 2, wherein said turning mirror group is mounted on a common substrate.

7. The improvement of claims 1 or 2, wherein said dichroic mirror group, said turning mirror group and said light valve group each is mounted on a common substrate.

8. The improvement of claims 1 or 2, wherein said plural light valves are reflective, whereby said light valve element group receives plural color light beams incident thereon, pixel modulates the same and reflects the same toward said first dichroic mirror element group, said first dichroic mirror element group and said first turning mirror group cooperating further to combine said modulated reflected plural color beams of light into a modulated polychromatic beam of light.

9. The improvement of claim 8, wherein said first dichroic mirror element group and said first turning mirror element group are oriented in substantially parallel relationship with said second dichroic mirror element group and said second turning mirror element group.

10. The improvement of claim 8, wherein said first dichroic mirror element group and said first turning mirror element group are oriented generally in a V-configuration with said second dichroic mirror element group and said second turning mirror element group.

11. The improvement of claims 1 or 2, wherein said plural light valves are transmissive, which further comprises a second dichroic mirror element group including plural dichroic mirrors positioned and oriented in coplanar relationship with one another and being spaced apart in parallel relationship with said first dichroic mirror element group on the opposite side of said light valve element group from said first dichroic mirror element group and which further comprises a turning mirror element group including plural turning mirrors positioned and oriented in coplanar relationship with one another, whereby said second dichroic mirror element group and said second turning mirror element group cooperate to combine modulated plural color beams into a modulated polychromatic beam of light.

12. The improvement of claims 1 or 2, wherein said first dichroic mirror element group is mounted on a first common plate glass substrate and wherein said first turning mirror element is mounted on a second common plate glass substrate.

13. The improvement of claim 12, wherein said light valve group includes plural thin-film liquid crystal shutter arrays mounted on a common substrate.

14. In an optical engine for splitting a first light beam into at least a second and third light beam, for modulating the second and third light beams and for recombining the modulated light beams to produce an output light beam, a structure comprising:

a single dichroic mirror including opposing substantially parallel planar surfaces, wherein said mirror is positioned and oriented within the optical engine selectively and simultaneously to split a first light beam incident upon one of said opposing surfaces and to combine the split light beam with a modulated second light beam incident upon the other of said opposing surfaces; and a second mirror disposed substantially parallel to said dichroic mirror, wherein the split light beam and the modulated second light beam are reflected by said second mirror in combining the split light beam with the modulated second light beam.

15. In an optical engine for splitting a first light beam into at least a second and third light beam, for modulating the second and third light beams and for combining the modulated light beams to produce an output light beam, a structure comprising:

a dichroic mirror including opposing substantially parallel planar surfaces, wherein said dichroic mirror is positioned and oriented within the optical engine selectively to transmit a second beam incident upon one of said opposing surfaces and to reflect a third beam incident upon the other of said opposing surfaces; and a second mirror disposed substantially parallel to said dichroic mirror, wherein the second light beam incident upon one of said opposing surfaces and the third light beam incident upon the other of said opposing surfaces are reflected by said second mirror.

16. An optical device for splitting a light beam into a plurality of light beams of different colors, modulating the plurality of light beams and recombining the modulated light beams to produce a modulated output light beam, the device comprising:

a first dichroic mirror element group including plural dichroic mirrors positioned and oriented in coplanar relationship to one another;

a first turning mirror element group including plural turning mirrors positioned and oriented in coplanar relationship with one another, said first dichroic mirror element group and said first turning mirror element group cooperating to split white light into plural color beams and to direct the same outwardly away from said first dichroic mirror element group; and a light valve group including plural light valves positioned and oriented in coplanar relationship with one another, said light valve group being positioned and oriented to receive plural color beams directed from said first dichroic mirror element group.

17. The optical device of claim 16 wherein said two mirror element groups are spaced apart in parallel relationship with one another.

18. The optical device of claim 16 wherein said first dichroic mirror element group and said first turning mirror element group are spaced apart in parallel relationship to one another.

19. The optical device of claim 16 wherein said light valve group is mounted on a common substrate.

20. The optical device of claim 16 wherein said dichroic mirror group is mounted on a common substrate.

21. The optical device of claim 16 wherein said turning mirror group is mounted on a common substrate.

22. The optical device of claim 16 said dichroic mirror group, said turning mirror group and said light valve group each is mounted on a common substrate.

23. The optical device of claim 16 wherein said plural light valves are reflective, whereby said light valve element group receives plural color light beams incident thereon, pixel modulates the same and reflects the same toward said first dichroic mirror element group, said first dichroic mirror element group and said first turning mirror group cooperating further to combine said modulated reflected plural color beams of light into a modulated polychromatic beam of light.

24. The optical device of claim 23 wherein said first dichroic mirror element group and said first turning mirror element group are oriented generally in a V-configuration with said second dichroic mirror element group and said second turning mirror element group.

25. The optical device of claim 16 wherein said first dichroic mirror element group is mounted on a first common plate glass substrate and wherein said first turning mirror element group is mounted on a second common plate glass substrate.

26. The optical device of claim 25 wherein said light valve group includes plural thin-film liquid crystal shutter arrays mounted on a common substrate.

27. The optical device of claim 26 wherein the third optical path includes a reflection off of the first optical interface and a reflection off of the second optical interface.

* * * * *